(12) United States Patent
Gaster

(10) Patent No.: US 9,218,223 B2
(45) Date of Patent: Dec. 22, 2015

(54) BARRIER SYNCHRONIZATION WITH DYNAMIC WIDTH CALCULATION

(71) Applicant: QUALCOMM Incorporated, San Diego, CA (US)

(72) Inventor: Benedict Ruben Gaster, Santa Cruz, CA (US)

(73) Assignee: QUALCOMM Incorporated, San Diego, CA (US)

( * ) Notice: Subject to any disclaimer, the term of this patent is extended or adjusted under 35 U.S.C. 154(b) by 221 days.

(21) Appl. No.: 13/965,818

(22) Filed: Aug. 13, 2013

(65) Prior Publication Data

US 2015/0052537 A1  Feb. 19, 2015

(51) Int. Cl.
*G06F 9/52* (2006.01)

(52) U.S. Cl.
CPC ...................................... *G06F 9/522* (2013.01)

(58) Field of Classification Search
CPC ...................................................... G06F 9/522
See application file for complete search history.

(56) References Cited

U.S. PATENT DOCUMENTS

| | | | |
|---|---|---|---|
| 6,574,725 B1 | 6/2003 | Kranich et al. | |
| 6,718,484 B1 | 4/2004 | Kodera | |
| 7,512,950 B1 | 3/2009 | Marejka | |
| 7,984,242 B2 | 7/2011 | Collard et al. | |
| 2009/0013323 A1 | 1/2009 | May et al. | |
| 2011/0078417 A1 | 3/2011 | Fahs et al. | |

OTHER PUBLICATIONS

HSA Foundation: "HSA Programmer's Reference Manual", Proposed Version.1.0, Dec. 11, 2012, pp. 1-316.
Gaster et al., "Can GPGPU Programming be Liberated from the Data-Parallel Bottleneck?", Computer, IEEE, US, [Online] vol. 45, No. 8, Aug. 1, 2012, XP011457249, ISSN: 0018-9162, DOI: 10.1109/MC.2012.257, pp. 42-52.
Harris, "Parallel Prefix Sum (Scan) with CUDA," Mar. 1, 2009, XP055149093, Retrieved from the Internet: URL: developer.download.nvidia.com/compute/cuda/2__2/sdk/website/projects/scan/doc/scan.pdf [retrieved on Oct. 27, 2014], 21 pp.
International Search Report and Written Opinion from International Application No. PCT/US2014/050143, dated Nov. 14, 2014, 17 pp.

*Primary Examiner* — Camquy Truong
(74) *Attorney, Agent, or Firm* — Shumaker & Sieffert, P.A.

(57) ABSTRACT

A sequencer of a processing unit determines, at runtime, a barrier width of a barrier operation for a group threads, wherein the barrier width is smaller than a total number of threads in the group of threads, and wherein threads in the group of threads execute data parallel code on one or more compute units. In response to each thread in a subgroup of the group of threads having executed the barrier operation, the subgroup including a same number of threads as the barrier width, the sequencer may enable the subgroup of the group of threads to execute on the one or more processors past the barrier operation without waiting for other threads in the group of threads to execute the barrier operation, wherein the subgroup of the group of threads is smaller than the total number of threads in the group of threads.

20 Claims, 6 Drawing Sheets

BARRIER SYNCHRONIZATION WITH DYNAMIC WIDTH CALCULATION

TECHNICAL FIELD

This disclosure relates to execution of computing instructions and more particularly relates to synchronization of computing instructions that execute in parallel.

BACKGROUND

Traditionally, computer programs have been written as sequential programs where the code of the computer programs executes sequentially on a single conventional processor. However, because the performance of specialized processors, such as graphics processing units (GPUs), that includes multiple processing cores continue to increase at a rapid rate, computer programs are increasingly being written to take advantage of such specialized processors. For example, computer programs are being written to include data parallel code, so that the same code may execute across multiple processing cores of a processor to operate on a set of data in parallel. Because such data parallel code is executed in parallel instead of sequentially, there may be no guarantee as to the order in which the code will finish processing the set of data. Therefore, it may be desirable to synchronize the parallel execution to ensure that the multiple processing cores have finished operating on the set of data before the values of the data are used in any further operations.

SUMMARY

In general, this disclosure describes techniques for synchronizing computing instructions that are processed in parallel using dynamic barrier width calculation. A block of threads may each execute the same set of instructions over a set of data, and barrier operations may be used to synchronize the block of threads after the threads execute respective write operations on the set of data and before the threads execute respective read operations on the set of data, to prevent the read operations from reading incorrect or invalid data. By default, a barrier operation may synchronize all of the threads in a block of threads, such that no threads can execute read operations subsequent to a barrier operation unless each and every thread in the block has executed a respective barrier operation. In contrast, the techniques disclosed herein may include techniques for dynamically calculating the width of a barrier operation, such that a subset of threads of a block can proceed to execute read operations after executing respective barrier operations even if other threads in the block have yet to execute their barrier operations.

In one example, a method for synchronizing threads includes determining, at runtime of an application executing on a host that includes data parallel code to be executed by a processing unit operably coupled to the host, a barrier width of a barrier operation for a group threads that each execute the data parallel code, wherein the barrier width is smaller than a total number of threads in the group of threads, and wherein threads in the group of threads execute the data parallel code on one or more compute units of the processing unit. The method further includes in response to each thread in a subgroup of the group of threads having executed respective barrier operations, the subgroup including a same number of threads as the determined barrier width, enabling the subgroup of the group of threads to execute respective operations on the one or more compute units subsequent to the respective barrier operations without waiting for other threads in the group of threads to execute barrier operations, wherein the subgroup of the group of threads is smaller than the total number of threads in the group of threads.

In another example, a computing system includes a computing system for synchronizing threads. The computing system includes a host. The computing system further includes a processing unit operably coupled to the host. The computing system further includes a sequencer module configured to: determine, at runtime of an application executing on the host that includes data parallel code to be executed by the processing unit, a barrier width of a barrier operation for a group threads that each execute the data parallel code on one or more compute units of the processing unit, wherein the barrier width is smaller than a total number of threads in the group of threads, and in response to each thread in a subgroup of the group of threads having executed respective barrier operations, the subgroup including a same number of threads as the determined barrier width, enable the subgroup of the group of threads to execute respective operations on the one or more compute units subsequent to the respective barrier operations without waiting for other threads in the group of threads to execute barrier operations, wherein the subgroup of the group of threads is smaller than the total number of threads in the group of threads.

In another example, a parallel processing apparatus includes means for determining, at runtime of an application executing on a host that includes data parallel code to be executed by a processing unit operably coupled to the host, a barrier width of a barrier operation for a group threads that each execute the data parallel code on one or more compute units of the processing unit, wherein the barrier width is smaller than a total number of threads in the group of threads. The parallel processing apparatus further includes in response to each thread in a subgroup of the group of threads having executed respective barrier operations, the subgroup including a same number of threads as the determined barrier width, means for enabling the subgroup of the group of threads to execute respective operations on the one or more compute units subsequent to the respective barrier operations without waiting for other threads in the group of threads to execute barrier operations, wherein the subgroup of the group of threads is smaller than the total number of threads in the group of threads.

In another example, a computer-readable storage medium may contain instructions that, when executed by at least one processor, cause the at least one processor to perform operations. The operations include determining, at runtime of an application executing on a host that includes data parallel code to be executed by a processing unit operably coupled to the host, a barrier width of a barrier operation for a group threads that each execute the data parallel code, wherein the barrier width is smaller than a total number of threads in the group of threads, and wherein threads in the group of threads execute the data parallel code on one or more compute units of the processing unit. The operations further include in response to each thread in a subgroup of the group of threads having executed respective barrier operations, the subgroup including a same number of threads as the determined barrier width, enabling the subgroup of the group of threads to execute respective operations on the one or more compute units subsequent to the respective barrier operations without waiting for other threads in the group of threads to execute barrier operations, wherein the subgroup of the group of threads is smaller than the total number of threads in the group of threads.

The details of one or more examples are set forth in the accompanying drawings and the description below. Other features, objects, and advantages will be apparent from the description and drawings, and from the claims.

DETAILED DESCRIPTION

In general, this disclosure describes techniques for synchronizing computing instructions that are processed in parallel using dynamic barrier width calculation. In data parallel processing, a computer program may include data parallel code. Data parallel code is a set of computing instructions that may run concurrently on multiple processing elements via multiple threads of execution so that the same set of computing instructions may be executed to perform the same operation on multiple different data points in parallel. Each individual invocation of the same data parallel code to operate on one of the multiple data points is a thread, and the threads may execute concurrently to perform the same instructions on multiple data points. Typically, the data parallel code may include write operations to write to a set of data and, after the write operations, read operations that reads the set of data that were written to by the write operations. However, not every thread that executes may complete execution of the write operations at the same time. If the read operations to read a set of data are executed before each thread has completed the write operations to write to the set of data, then the read operations may read incorrect or invalid results. To ensure that the read operations do not read incorrect or invalid results, each thread may be required to execute a barrier operation after executing the data parallel write operations on the set of data before proceeding to execute read operations on the set of data, and none of the threads for executing the data parallel code may be allowed to proceed after executing the barrier operation to execute the read operations until all of the threads have also executed the barrier operation.

Figure 1:
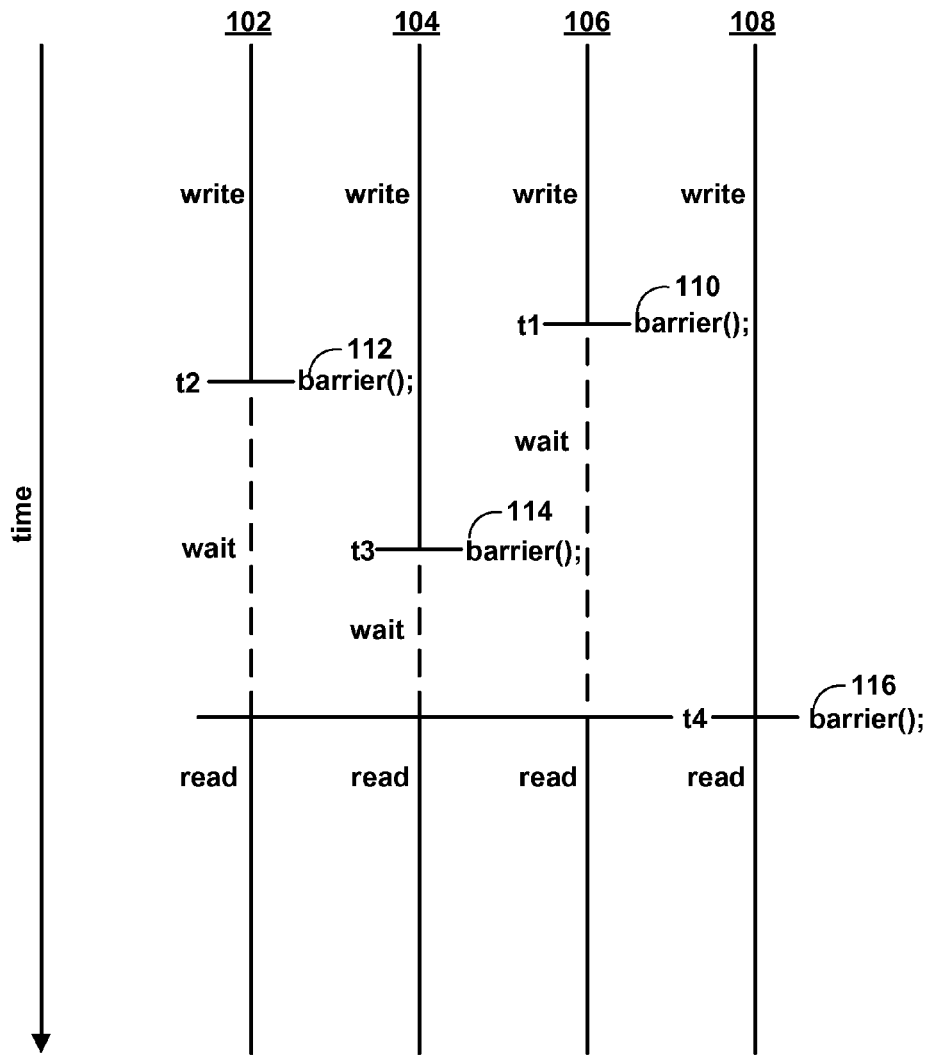
FIG. 1 is a conceptual diagram illustrating synchronization of threads according to some aspects of the present disclosure.

FIG. 1 is a conceptual diagram illustrating synchronization of threads according to some aspects of the present disclosure. As shown in FIG. 1, threads 102, 104, 106, and 108 may execute data parallel code in parallel to each perform write operations to a set of data and to subsequently each perform read operations on the set of data. At time t1, thread 106 has finished its write operations and reaches barrier operation 110. Barrier operation 110 indicates that thread 106 has completed execution of its write operations. However, because not every thread has reached a barrier operation (i.e., threads 102, 104, and 108 have not completed execution of respective write operations), thread 106 must wait until the other threads 102, 104, and 108 have also reached a barrier operation before proceeding to execute read operations to read the set of data. At time t2, thread 102 reaches barrier operation 112 because thread 102 has finished executing its write operations. Similar to thread 106, because threads 104 and 108 have yet to also reach a barrier operation, thread 102 must also wait until threads 104 and 108 have also reached a barrier operation before proceeding to execute read operations to read the set of data. At time t3, thread 104 reaches barrier operation 114. Similar to threads 102 and 106, because thread 108 has yet to also reach a barrier operation, thread 104 must also wait until thread 108 has also reached a barrier operation before proceeding to execute read operations to read the set of data. At time t4, thread 108 reaches barrier operation 116. Because every thread 102, 104, 106, and 108 in the group of threads have reached a barrier operation, each of the threads 102, 104, 106, and 108 are now each allowed to execute read operations to read the set of data.

However, a barrier operation that requires threads in a group of threads to wait for every thread in the group of threads to reach the barrier operation before allowing the threads in the group to proceed may be inefficient. For example, the read operations to be performed after execution of the write may depend on only some (but not all) of the threads finishing its respective execution of the write operations. Thus, even if all of the threads depended on by the additional operations have reached the barrier operation, those threads cannot execute its respective read operations until every thread in the group have finished executing its respective write operations and reached the barrier operation.

An example code fragment written in the C language showing such use of a barrier operation is shown below:

```
local int * ptr;            // shared memory resource
                            // share resources between sub-
                            // groups of size 32
if (thread_id % 32) {
    ptr[thread_id%32] = value; // memory write//
}
barrier( );                 // make sure that all threads have
                            //performed memory write //
x = ptr[thread_id%32];      // read memory
```

As shown in the code fragment above, the barrier operation is the synchronization point for a group of threads that each perform the if (thread_id%32) {ptr[thread_id%32]=value;} write operation before the subsequent x=ptr[thread_id%32] read operation is performed, thereby ensuring that ptr[thread_id%32] is read from and the x variable is assigned the value of ptr[thread_id%32] only after each thread in the group has finished performing the if (thread_id%32) {ptr[thread_id%32]=value;} operation and has reached the synchronization point. However, because thread_id%32 will produce values of only 0 to 31, it may be unnecessary for every thread in the group of threads to wait until each thread has performed the barrier operation before performing the x=ptr[thread_id%32] operation if the group includes more than 32 threads. Rather, it may only be necessary for groups of 32 threads wait to ensure that the x=ptr[thread_id%32] operation will operate correctly. Therefore, if the group of threads includes more than 32 threads, the barrier operation may be over inclusive in requiring more threads to wait than is necessary to ensure the integrity of the x=ptr[thread_id%32] operation.

One approach to reducing the inefficiencies of barrier operations may include specifying a width of the barrier operation. The width of the barrier operation may be the number of threads required to reach the barrier operation before allowing the threads to proceed past the barrier operation, and the width may typically be specified to be fewer than the total number of threads in the group of threads. For example, the barrier operation may take a width as a parameter. In another example, the width may be specified as a constant. At compile time the width for the barrier operation may be hardcoded into the computer program that calls the barrier operation. For the example code fragment above, a width of 32 may be specified at compile time for the barrier operation.

However, hardcoding the width of barrier operations at compile time may limit the usefulness and flexibility of barrier operations because it may not be useful for situations where the desired width of barrier operations is not known at compile time. Furthermore, programmers writing data parallel code may not know the appropriate width to specify. Therefore, it may be desirable to dynamically calculate the width of barrier operations at runtime.

Figure 2:
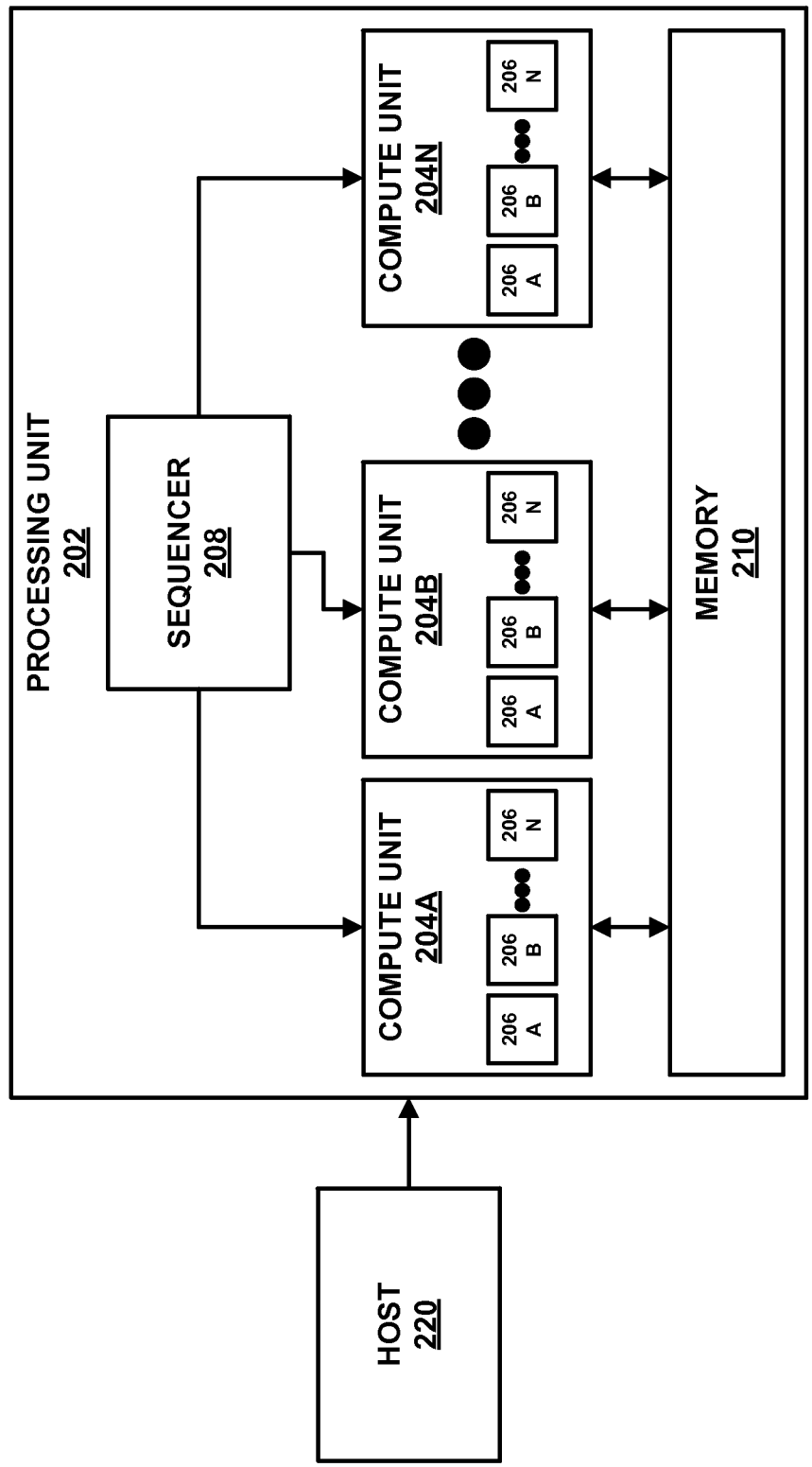
FIG. 2 is a block diagram illustrating a parallel processing computing system according to some aspects of the present disclosure.

FIG. 2 is a block diagram illustrating a parallel processing computing system for executing data parallel code according to some aspects of the present disclosure. As shown in FIG. 2, host 220 may be communicably coupled to processing unit 202. Processing unit 202 may include compute units 204A-204N ("compute units 204"), and each of the compute units 204 may include processing elements 206A-206N ("processing elements 206").

Host 220, in some examples, may be a microprocessor, such as a central processing unit (CPU), that is configured to process instructions of a computer program for execution within the parallel processing computing system. In some examples, host 220 may, upon encountering data parallel code during execution of a computer program, communicate the data parallel code to processing unit 202 for execution.

Processing unit 202 may be a graphics processing unit (GPU) or any other suitable processing unit that is configured to process at least some of the instructions of computer programs. Processing unit 202 may be operably coupled to host 220 and may receive data parallel code of a computer program from host 220. Processing unit 202 may include one or more programmable processors, such as compute units 204. Compute units 204 may each include processing elements 206. Compute units 204 may each include local memory (i.e. cache). Processing elements 206 may be processing cores of the respective compute units 204. For example, processing elements 206 may each include one or more arithmetic logic units (ALUs) or other circuits configured to perform arithmetic and logic operations.

Each individual invocation of the same data parallel code to operate on one of the multiple data points is a thread, and the threads may execute concurrently to perform the same instructions on multiple data points. In some examples, threads may also be known as work items. Processing unit 202 may group threads together into blocks. Typically, processing unit 202 may group all of the threads spawned by the same data parallel code into one or more blocks. In some examples, blocks may also be known as workgroups. In some examples, all of the threads in a single block may be limited to being performed on one of the compute units 204. In some examples, a block of threads may be a group of threads where a barrier operation may, if a width of the barrier operation is not specified or determined to be smaller than the number of threads in the group, apply to each thread in the group. Thus, if a thread in the group of threads reaches such a barrier, then the thread may have to wait for each thread in the group to also reach the barrier before the thread is allowed to proceed past the barrier.

Processing unit 202 can group threads within a block into one or more warps or wavefronts. A wavefront is a basic unit of scheduling for compute units 204 and may typically include a subset of the threads in a block. For example, given a block of 512 threads, a wavefront may include 32 threads, and the threads in the block may be grouped into 512/32=16 warps. A wavefront may typically include as many threads as there are processing elements 206 in a single compute unit (i.e., compute unit 204A), so that processing elements 206 of a single compute unit can simultaneously process every thread in a wavefront.

Because a wavefront of threads execute the same instructions on multiple elements of data, host 220 may vectorize the data to be processed by the wavefront into a vector of data and may communicate that vector to processing unit 202. Typically, the data is grouped into vectors having as many elements as there are threads in a single wavefront. In other words, the number of threads in a wavefront is the same as the width of the vector of data it operates on. Therefore, the number of threads in a wavefront can be referred to as the vector width of the wavefront.

As discussed above, a wavefront contains as many or fewer threads as there are processing elements 206 in a single compute unit. Therefore, all of the threads of a wavefront can be executed in parallel by processing elements 206 of a single compute unit at the same time because no threads in the wavefront has to wait for a busy processing unit to finish processing another thread in the same wavefront. Therefore, threads of a single wavefront may be guaranteed to execute substantially in parallel, so that a barrier operation may not be required to synchronize the threads within a single wavefront.

One of compute unit 204 may execute one or more wavefronts in parallel using processing elements 206 of the compute unit 204. When the threads of a block are executed, barrier operations may be used to synchronize the threads of the block. As discussed above, a barrier operation may operate so that threads of a block may be required to wait until all threads of a block have performed the barrier operation.

Sequencer 208 may be configured to manage and schedule the execution of the data parallel code amongst compute units 204. For example, sequencer 208 may schedule the execution of blocks of threads and wavefronts of threads on compute units 204. Sequencer 208 may also be configured to synchronize blocks of threads. For example, sequencer 208 may unload threads from processing elements 206 if those threads have performed a barrier operation and are idling while waiting for the other threads of its block to perform their respective barrier operations to allow other threads that are waiting to execute to be processed by processing elements 206. Sequencer 208 may also, upon determining that the threads of a block have all performed barrier operations, reload the idling threads back to processing elements 206.

Sequencer 208 may dynamically determine a width of a barrier operation for a group of threads that are executing the same data parallel code on a multitude of data points based on the data parallel code that is to be executed by the threads in the group, where the determined width is smaller than the total number of threads in the group. The group, in some examples, may be a block of threads. The width of a barrier operation may be the number of threads in a block that must reach the barrier operation before any of the threads are allowed to execute operations subsequent to the barrier operation. Because the determined width is smaller than the total number of threads in the group, sequencer 208 may, by determining the barrier width, allow the threads of the group to execute operations subsequent to the barrier operations even if not every thread in the group has reached a respective barrier operation.

Sequencer 208 may determine the width of a barrier operation for a group of threads based on the data parallel code that is to be executed by the threads in the group both prior to the barrier operation and/or subsequent to the barrier operation. For example, based on the code fragment above, sequencer 208 may determine that the data parallel code will write to 32 ptr array locations prior to the barrier operation and that the data parallel code will read from 32 ptr array locations subsequent to the barrier operation. Therefore, sequencer may determine a barrier width of 32 for the particular barrier operation.

In one example, sequencer 208 may store the dynamically determined barrier widths of barrier operations in one or more width registers. Responsive to a thread reaching the barrier operation having its barrier width stored in the width register, the number in the one or more width registers is decremented. Responsive to the number in the one or more width registers reaching zero, any threads in the block that are waiting after having reached the barrier operation may be allowed to continue execution. In another example, sequencer 208 may include both a width register that stores a number indicating the width of a barrier operation and a waiting register that stores the number of threads that are waiting for other threads in the block to reach the barrier. Responsive to a thread reaching the barrier operation, the number in the waiting register is incremented. Responsive to the number in the waiting register being equal to the number in the width register, any threads in the block that are waiting after reaching the barrier operation may be allowed to continue execution.

In some examples, dynamically determining the barrier width may enable developers of computer programs containing data parallel code to more easily write cross-platform data parallel code that may execute across a variety of parallel computing systems. For example, some parallel computing systems may guarantee that every thread in a single wavefront can execute simultaneously, so that if the width of a barrier is less than the vector width of a wavefront, then the barrier operation is unnecessary. For example, if the vector width for a wavefront is 16, such as because the compute unit contains 16 processing elements, then barrier operations having barrier widths of 16 or less may be unnecessary. However, because a computer programmer may not know on exactly which parallel computing system his data parallel code will run and therefore may not know how many processing elements a compute unit for the parallel processing system contains, if the computer programmer hard codes a barrier width that is less than the vector width of a wavefront for a particular parallel computing system, then that data parallel code, when run on that particular parallel computing system, may perform extraneous barrier operations and may slow down execution of the data parallel code. In contrast, sequencer 208 may determine a barrier width for a barrier operation as well as the vector width of wavefronts for the particular parallel computing system, and may determine not to perform that barrier operation if the determined barrier width is less than the vector width of the wavefront for the parallel computing system on which the data parallel code executes. In some examples, sequencer 208 may determine barrier widths that are larger than the vector width of wavefronts.

Dynamically calculating barrier widths may also enable the use of barrier operations in conditional statements of dynamic control flow where the conditional statements do not evaluate uniformly throughout the group of threads. Consider the following pseudocode:

```
if (x < y) {
    // true statements
    barrier( );
}
else {
    // false statements
}
```

Typically, for a group of threads, if the conditional $x<y$ is not evaluated as true in every thread, then including the barrier operation so that it is performed only if the conditional $x<y$ evaluates to true may cause the group of threads in the group to deadlock because the threads where $x<y$ is evaluated as false would never perform the barrier operation. In contrast, in the present disclosure, sequencer 208 may dynamically set the width of the barrier as equal to the number of times $x<y$ evaluates as true, such as by pre-evaluating $x<y$ for the set of values x and y. Therefore, if the width of the barrier is set as four, then the barriered threads may continue past the barrier once four threads have executed the barrier operation without having to wait for the rest of the threads in the group of work items to execute the barrier operation.

Sequencer 208 may also determine a barrier width of a barrier operation to synchronize together subgroups of threads where the threads of the subgroups are consecutive threads of a block. For example, given a block of sixteen threads $t_0, t_1, \ldots, t_{15}$, if the barrier width for the barrier operations of the threads is specified as four, then the first four threads of the block $t_0$ to $t_3$ may synchronize together, the second four threads of the block $t_4$ to $t_7$ may synchronize together, the third group of four threads $t_8$ to $t_{11}$ may synchronize together, and the fourth group of four threads $t_{12}$ to $t_{15}$ may synchronize together. In this example, each thread in the group of threads $t_0$ to $t_3$ may only be required to wait for all of the threads $t_0$ to $t_3$ in the group to execute the barrier operation before being able to proceed in its execution, each thread in the group of threads $t_4$ to $t_7$ may only be required to wait for all of the threads $t_4$ to $t_7$ in the group to execute the barrier operation before being able to proceed in its execution, each thread in the group of threads $t_8$ to $t_{11}$ may only be required to wait for all of the threads $t_8$ to $t_{11}$ in the group to execute the barrier operation before being able to proceed in its execution, and each thread in the group of threads $t_{12}$ to $t_{15}$ may only be required to wait for all of the threads $t_{12}$ to $t_{15}$ in the group to execute the barrier operation before being able to proceed in its execution. Therefore, for example, if threads $t_1, t_8, t_2$, and $t_3$, are the first four threads to reach the barrier operation, threads $t_1, t_2$, and $t_3$ may be required to wait for thread $t_4$ to reach the barrier operation before those threads $t_1, t_2$, and $t_3$ are allowed to continue execution past the barrier operation, even though four threads of the block of sixteen threads have reached the barrier operation.

Figure 3:
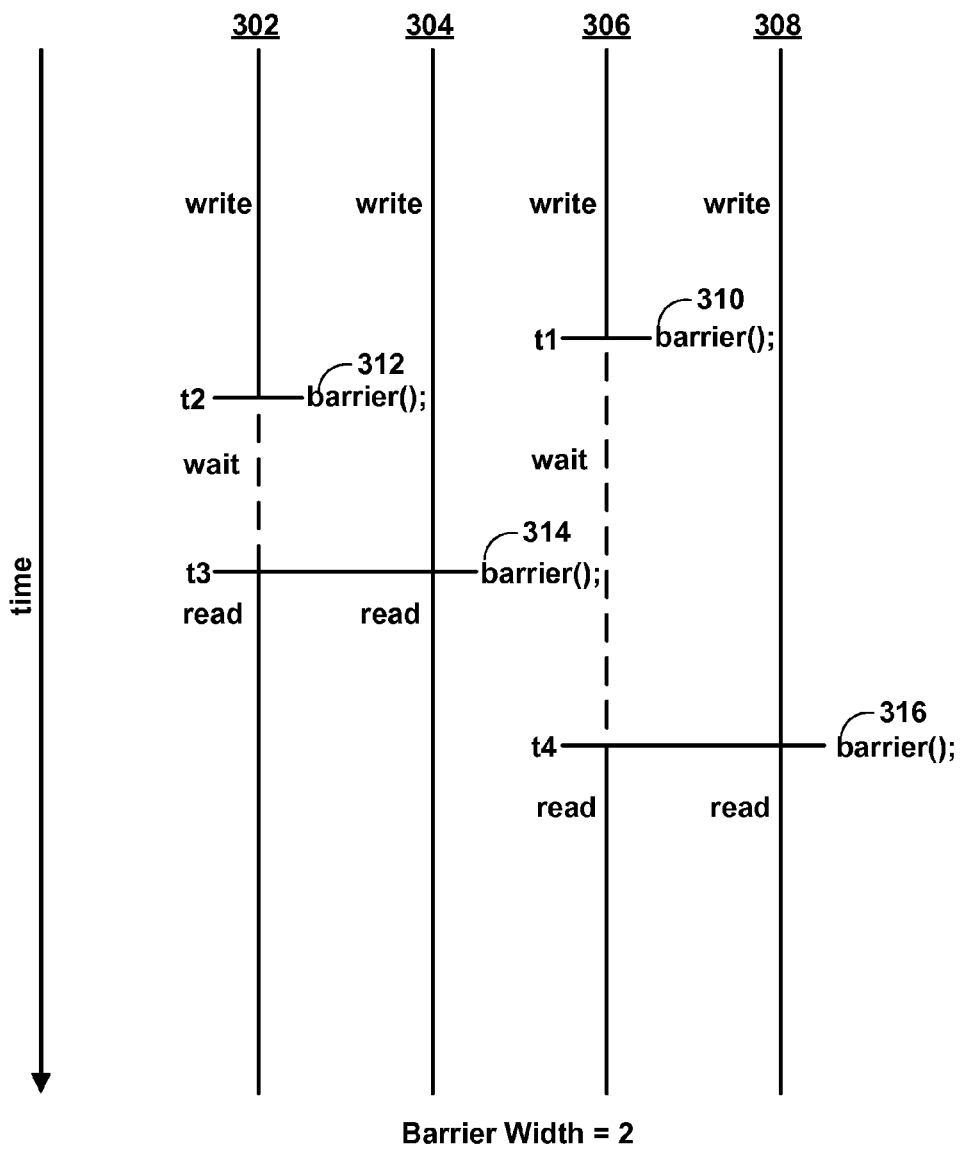
FIG. 3 is a conceptual diagram illustrating synchronization of threads using a dynamic barrier width according to some aspects of the present disclosure.

FIG. 3 is a conceptual diagram illustrating synchronization of threads using a dynamic barrier width according to some aspects of the present disclosure. As shown in FIG. 3, a sequencer, such as sequencer 208 shown in FIG. 2, may determine that threads 302 and 304 may be synchronized together, and that threads 306 and 308 may be synchronized together. Thus, the sequencer may determine a barrier width of 2 for threads 302, 304, 306, and 308 that may execute data parallel code in parallel. Therefore threads 302 and 304 are grouped into a subgroup of threads, and threads 306 and 308 may be grouped into another subgroup of threads. At time t1, thread 306 has finished executing its write operation and reaches barrier operation 310. However, because not every thread in its subgroup has also finished executing its respective write operations and reached a barrier operation, thread 306 must wait until the other thread (i.e., thread 308) in the subgroup has also finished executing its write operation and reached a barrier operation before proceeding to execute a read operation subsequent to barrier operation 310. At time t2, thread 302 finishes executing a write operation and reaches barrier operation 312. Similarly, because thread 304, which is the other member of the subgroup with thread 302, has yet to also finish executing a write operation and reach a barrier operation, thread 302 must also wait before proceeding to execute code subsequent to barrier operation 312. At time t3, thread 304 reaches barrier operation 314. Because both threads 302 and 304 have reached barrier operations 312 and 314, threads 302 and 304 may proceed to execute respective read operations subsequent to barrier operation 314. At time t4, thread 308 reaches barrier operation 316. Because both threads 306 and 308 have reached a barrier operation, threads 306 and 308 are now allowed to execute respective read operations subsequent to its respective barrier operations. As can be seen in FIG. 3, by setting a barrier width that is smaller than the total number of threads in a group of threads, threads may be able to resume execution past the barrier much more quickly. For instance, by not setting a barrier width that is smaller than the total number of threads in a group of threads, threads 302, 304, and 306 would remain idle after executing respective barrier operations 310, 312, and 314, until thread 308 executed barrier operation 316 at time t4, which is later than times t1, t2, and t3.

Figure 4:
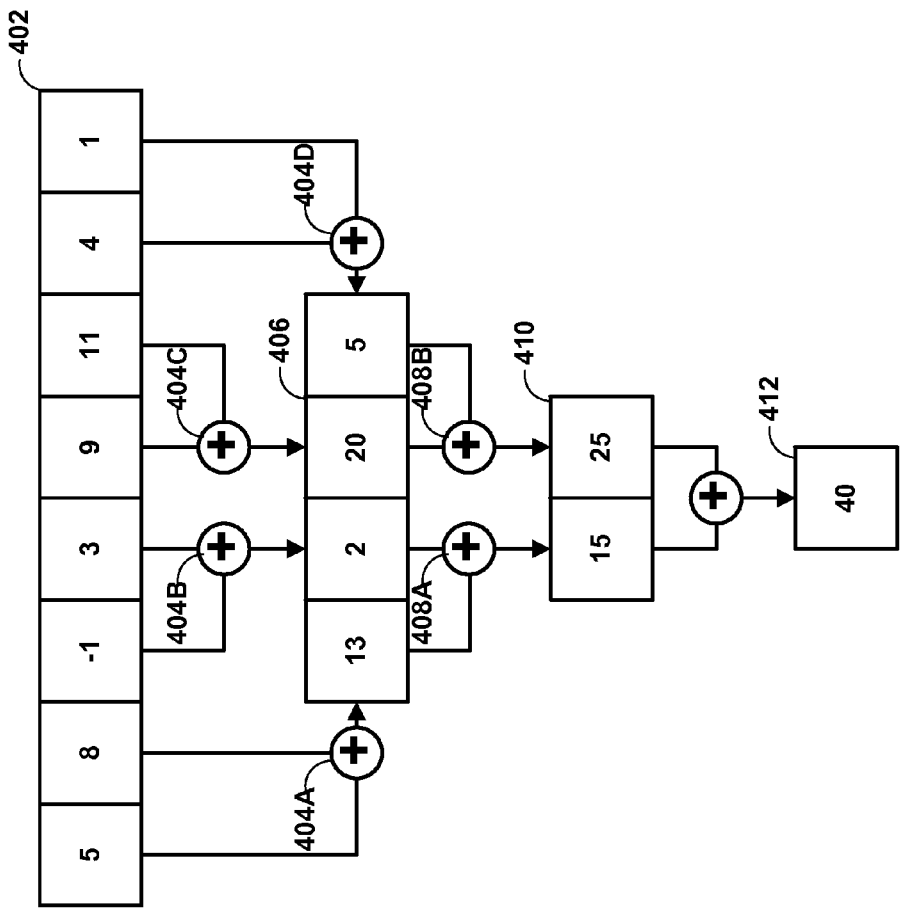
FIG. 4 is a conceptual diagram illustrating an example parallel reduction according to some aspects of the present disclosure.

Dynamically determining the width of a barrier operation may be useful in a parallel reduction, especially when the size of a collection of numbers to be reduced is not known until runtime. A reduction is a technique to sum a collection of numbers, and a parallel reduction may be a reduction where data parallel code can execute to sum the elements of the reduction in parallel. FIG. 4 is a conceptual diagram illustrating an example parallel reduction according to some aspects of the present disclosure. As shown in FIG. 4, array 402 may include a collection of eight numbers to be summed together. The data parallel code to perform the reduction may execute so that each work item sums two consecutive elements of array 402 together. Thus, in a first pass of the parallel reduction, sum operations 404A-404D ("sum operations 404") may execute in parallel via four parallel threads to each sum two of the elements of array 402 to reduce the eight element array 402 to a four element array 406 containing the four resulting sums resulting from each of the sum operations 404.

However, because the size of the collection may be unknown at runtime, it may be impossible for a programmer to know at compile time the exact barrier width necessary for barrier operations in the data parallel code to perform the parallel reduction. For example, the size of the collection may depend on user input, so that a user may input 8 numbers, 20 numbers, or any other sets of numbers. In the specific example shown in FIG. 4, a sequencer, such as sequencer 208 shown in FIG. 2, may determine based on the size (8) of array 402, a barrier width of 4 for the barrier operations to be performed by the four threads subsequent to performing sum operations 404.

The first round of reduction via sum operations 404 may produce array 406 containing four resulting elements. To further reduce the elements of array 406, only two threads may be needed to perform sum operations 408A and 408B ("sum operations 408"). Therefore, the sequencer may determine that based on the size (4) of array 406, a barrier width of 2 for the barrier operations to be performed by the two threads subsequent to performing sum operations 408.

The second round of reduction via sum operations 408 may produce array 410 containing two resulting elements. To further reduce the elements of array 410, only a single thread may be needed to perform sum operation 412. Therefore, the sequencer may determine that a barrier operation does not need to be performed. Therefore, the sequencer may determine to ignore the barrier operation specified in code after performing sum operation 412.

The data parallel code for performing the sum reduction is typically written as a loop, so that the barrier operation is included inside the loop. Therefore, if the width of the barrier operation is to be set at compile time, assuming that the programmer knows the initial number of elements in the collection to reduce, the programmer may have to unroll the loop to manually insert barrier operations of a specific width after each set of sum operations. In contrast, in the current example, the synthesizer may dynamically determine the barrier width for each iteration of the barrier operation.

Figure 5:
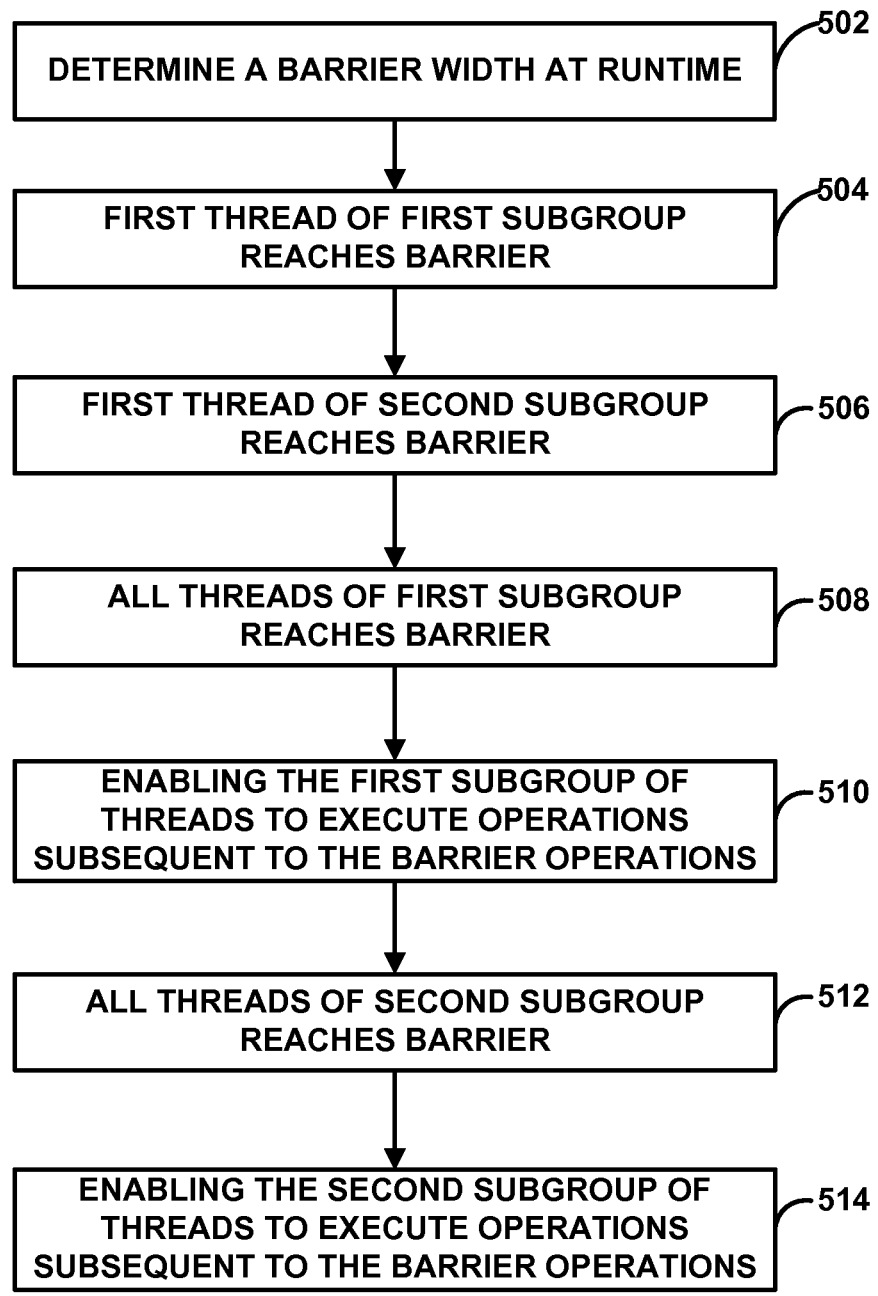
FIG. 5 is a flowchart illustrating an example process of synchronizing threads using a dynamic barrier according to some aspects of the present disclosure.

FIG. 5 is a flow diagram illustrating an example process of synchronizing threads using a dynamic barrier according to some aspects of the present disclosure. As shown in FIG. 5, a sequencer, such as sequencer 208 shown in FIG. 2, may dynamically determine, at runtime of a computer application executing on a host, such as host 220 shown in FIG. 2, that includes data parallel code to be executed by a processing unit, such as processing unit 202 shown in FIG. 2, operably coupled to the host, a barrier width of a barrier operation for a group threads that each execute the data parallel code, wherein the barrier width is smaller than a total number of threads in the group of threads (502). In the example of FIG. 5, the group of threads may include 64 threads, and the sequencer may determine a barrier width of 32. Therefore, the 64 threads may include two subgroups of 32 threads each, where the threads of a subgroup is synchronized with the other threads of that same subgroup. At a first time, a first thread of the first subgroup of the group of threads may reach the barrier (504) and may wait for the rest of the threads of the first subgroup to also reach the barrier. At a second time, a first thread of the second subgroup of the group of threads may reach the barrier (506) and may wait for the rest of the threads of the second subgroup to also reach the barrier.

At a third time, all threads of the first subgroup may reach the barrier (508). The sequencer may, in response to each thread in the first subgroup of the group of threads having executed respective barrier operations, the first subgroup including a same number of threads as the determined barrier width, enable the first subgroup of the group of threads to execute on the one or more compute units subsequent to the respective barrier operations without waiting for other threads in the group of threads to execute barrier operations, wherein the first subgroup of the group of threads is smaller than the total number of threads in the group of threads (510).

At a fourth time, all threads of the second subgroup may reach the barrier (512). The sequencer may, in response to each thread in the second subgroup of the group of threads having executed respective barrier operations, the second subgroup including a same number of threads as the determined barrier width, enable the second subgroup of the group of threads to execute on the one or more compute units subsequent to the respective barrier operations without waiting for other threads in the group of threads to execute barrier operations, wherein the second subgroup of the group of threads is smaller than the total number of threads in the group of threads (514).

In some examples, determining the barrier width may include determining the barrier width of the barrier operation based at least in part on the data parallel code. In some examples, the barrier width of the barrier operation is larger than a vector width of a wavefront of the one or more processors. In some examples, the sequencer may further determine not to perform the barrier operation if the barrier width of the barrier operation is smaller than a vector width of a wavefront for the one or more processors. In some examples, the barrier operation is included in a conditional statement, and the conditional statement does not evaluate uniformly throughout the group of threads. In some examples, the threads in the subgroup of the group of threads are consecutive threads in the group of threads. In some examples, the barrier operation is included in a loop. In some examples, the sequencer may dynamically determine the barrier width of the barrier operation for each iteration of the loop, wherein the determined barrier width is different in at least two iterations of the loop.

Figure 6:
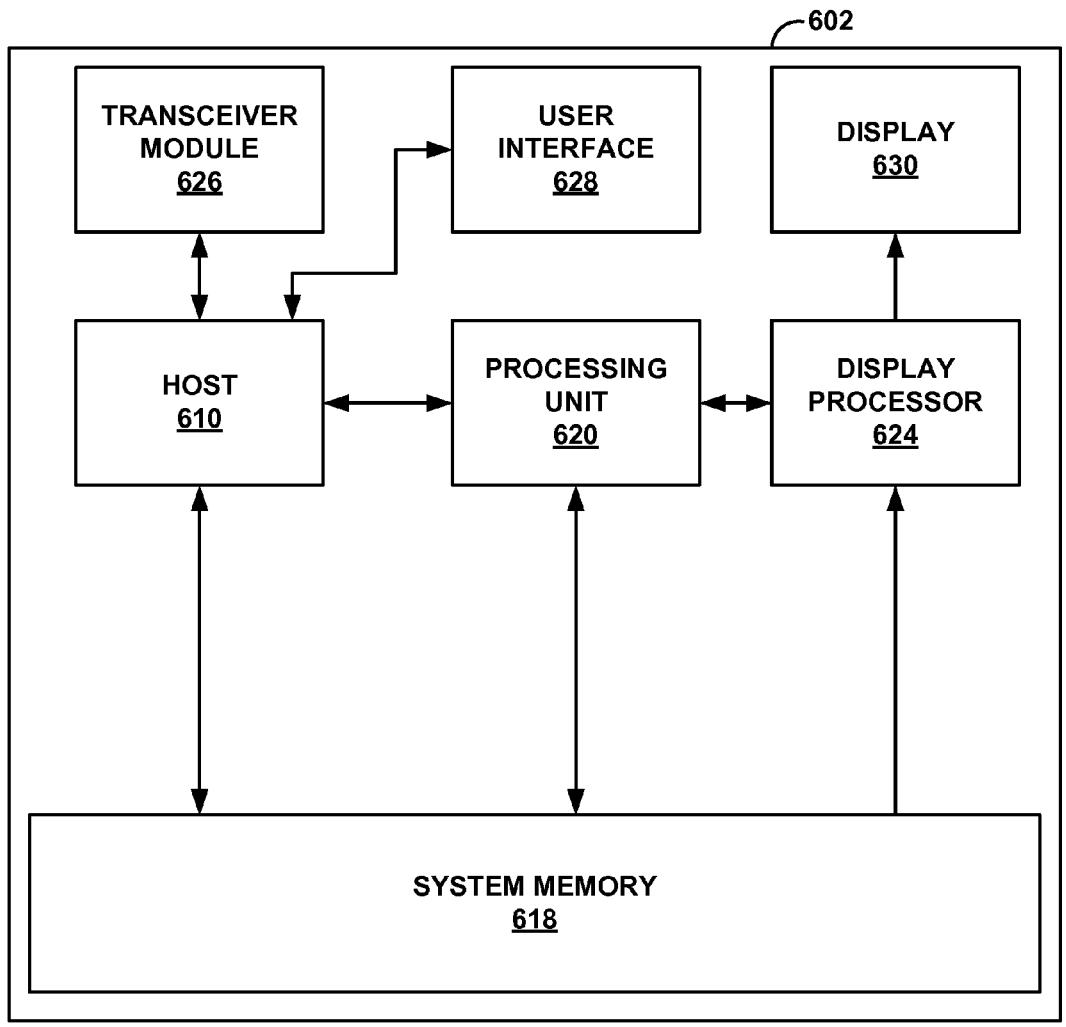
FIG. 6 is a block diagram illustrating an example of a device that may be configured to implement one or more aspects of this disclosure.

FIG. 6 is a block diagram illustrating an example of a device that may be configured to implement one or more aspects of this disclosure. For example, FIG. 6 illustrates device 602. Examples of the device 602 include, but are not limited to, video devices, media players, set-top boxes, wireless handsets such as mobile telephones and so-called smartphones, personal digital assistants (PDAs), desktop computers, laptop computers, gaming consoles, video conferencing units, tablet computing devices, and the like.

In the example of FIG. 6, device 602 may include host 610, system memory 618, and processing unit 620. Host 610 may be similar to host 220 shown in FIG. 2, and processing unit 620 may be similar to processing unit 202 shown in FIG. 2. For purposes of brevity, host 610, system memory 618, and processing unit 620 are not further described with respect to FIG. 6. Device 622 may also include display processor 624, transceiver module 626, user interface 628, and display 630. Transceiver module 626 and display processor 624 may both be part of the same integrated circuit (IC) as host 610 and/or processing unit 620, may both be external to the IC or ICs that include host 610 and/or processing unit 620, or may be formed in the IC that is external to the IC that includes host 610 and/or processing unit 620.

Device 622 may include additional modules or units not shown in FIG. 6 for purposes of clarity. For example, device 622 may include a speaker and a microphone, neither of which are shown in FIG. 6, to effectuate telephonic communications in examples where device 622 is a mobile wireless telephone, or a speaker where device 622 is a media player. Device 622 may also include a video camera. Furthermore, the various modules and units shown in device 622 may not be necessary in every example of device 622. For example, user interface 628 and display 630 may be external to device 622 in examples where device 622 is a desktop computer or other device that is equipped to interface with an external user interface or display.

Examples of user interface 628 include, but are not limited to, a trackball, a mouse, a keyboard, and other types of input devices. User interface 628 may also be a touch screen and may be incorporated as a part of display 630. Transceiver module 626 may include circuitry to allow wireless or wired communication between device 622 and another device or a network. Transceiver module 626 may include modulators, demodulators, amplifiers and other such circuitry for wired or wireless communication.

In some examples, processing unit 620 may be a GPU that may store a fully formed image in system memory 618. Display processor 624 may retrieve the image from system memory 618 and output values that cause the pixels of display 630 to illuminate to display the image. Display 630 may be the display of device 622 that displays the image content generated by processing unit 620. Display 630 may be a liquid crystal display (LCD), an organic light emitting diode display (OLED), a cathode ray tube (CRT) display, a plasma display, or another type of display device.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The software stored on the data storage media may be transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method for synchronizing threads, the method comprising:
   determining, at runtime of an application executing on a host that includes data parallel code to be executed by a processing unit operably coupled to the host, a barrier width of a barrier operation for a group threads that each execute the data parallel code on one or more compute units of the processing unit, wherein the barrier width is smaller than a total number of threads in the group of threads, and wherein the barrier operation is included in a loop;

dynamically re-determining the barrier width of the barrier operation for each iteration of the loop, wherein the determined barrier width is different in at least two iterations of the loop;

in response to each thread in a subgroup of the group of threads having executed respective barrier operations, the subgroup including a same number of threads as the determined barrier width, enabling the subgroup of the group of threads to execute respective operations in respective iterations of the loop on the one or more compute units subsequent to the respective barrier operations without waiting for other threads in the group of threads to execute barrier operations, wherein the subgroup of the group of threads is smaller than the total number of threads in the group of threads; and determining not to perform the barrier operation if the barrier width of the barrier operation is smaller than a vector width of a wavefront for the one or more compute units.

2. The method of claim 1, wherein the determining comprises:

determining the barrier width of the barrier operation based at least in part on the data parallel code.

3. The method of claim 1, further comprising:

determining to perform the barrier operation if the barrier operation is larger than a vector width of a wavefront of the one or more compute units.

4. The method of claim 1, wherein the barrier operation is included in a conditional statement, and wherein the conditional statement does not evaluate uniformly throughout the group of threads.

5. The method of claim 1, wherein threads in the subgroup of the group of threads are consecutive threads in the group of threads.

6. A computing system for synchronizing threads, comprising:

a host;

a processing unit operably coupled to the host;

wherein the processing unit comprising at least one of a plurality of processors;

a sequencer module configured to:

determine, at runtime of an application executing on the host that includes data parallel code to be executed by the processing unit, a barrier width of a barrier operation for a group threads that each execute the data parallel code on one or more compute units of the processing unit, wherein the barrier width is smaller than a total number of threads in the group of threads, and wherein the barrier operation is included in a loop;

dynamically re-determine the barrier width of the barrier operation for each iteration of the loop, wherein the determined barrier width differs in at least two iterations of the loop;

in response to each thread in a subgroup of the group of threads having executed respective barrier operations, the subgroup including a same number of threads as the determined barrier width, enable the subgroup of the group of threads to execute respective operations in respective iterations of the loop on the one or more compute units subsequent to the respective barrier operations without waiting for other threads in the group of threads to execute barrier operations, wherein the subgroup of the group of threads is smaller than the total number of threads in the group of threads, and determine not to perform the barrier operation if the barrier width of the barrier operation is smaller than a vector width of a wavefront for the one or more compute units.

7. The computing system of claim 6, wherein determine the barrier width comprises:

determine the barrier width of the barrier operation based at least in part on the data parallel code.

8. The computing system of claim 6, further comprising:

determine to perform the barrier operation if the barrier width of the barrier operation is larger than a vector width of a wavefront of the one or more compute units.

9. The computing system of claim 6, wherein the barrier operation is included in a conditional statement, and wherein the conditional statement does not evaluate uniformly throughout the group of threads.

10. The computing system of claim 6, wherein threads in the subgroup of the group of threads are consecutive threads in the group of threads.

11. A parallel processing apparatus comprising:

means for determining, at runtime of an application executing on a host that includes data parallel code to be executed by a processing unit operably coupled to the host, a barrier width of a barrier operation for a group threads that each execute the data parallel code on one or more compute units of the processing unit, wherein the barrier width is smaller than a total number of threads in the group of threads, and wherein the barrier operation is included in a loop;

means for dynamically re-determining the barrier width of the barrier operation for each iteration of the loop, wherein the determined barrier width is different in at least two iterations of the loop in response to each thread in a subgroup of the group of threads having executed respective barrier operations, the subgroup including a same number of threads as the determined barrier width, means for enabling the subgroup of the group of threads to execute respective operations in respective iterations of the loop on the one or more compute units subsequent to the respective barrier operations without waiting for other threads in the group of threads to execute barrier operations, wherein the subgroup of the group of threads is smaller than the total number of threads in the group of threads; and means for determining not to perform the barrier operation if the barrier width of the barrier operation is smaller than a vector width of a wavefront for the one or more compute units.

12. The parallel processing apparatus of claim 11, wherein the means for determining further comprises:

means for determining the barrier width of the barrier operation based at least in part on the data parallel code.

13. The parallel processing apparatus of claim 11, further comprising:

means for determining to perform the barrier operation if the barrier width of the barrier operation is larger than a vector width of a wavefront of the one or more compute units.

14. The parallel processing apparatus of claim 11, wherein the barrier operation is included in a conditional statement, and wherein the conditional statement does not evaluate uniformly throughout the group of threads.

15. The parallel processing apparatus of claim 11, wherein threads in the subgroup of the group of threads are consecutive threads in the group of threads.

16. A non-transitory computer-readable storage medium containing instructions that, when executed by at least one processor, cause the at least one processor to perform operations comprising:

determining, at runtime of an application executing on a host that includes data parallel code to be executed by a processing unit operably coupled to the host, a barrier width of a barrier operation for a group threads that each execute the data parallel code, wherein the barrier width is smaller than a total number of threads in the group of threads, and wherein threads in the group of threads execute the data parallel code on one or more compute units of the processing unit, and wherein the barrier operation is included in a loop;

dynamically re-determining the barrier width of the barrier operation for each iteration of the loop, wherein the determined barrier width is different in at least two iterations of the loop;

in response to each thread in a subgroup of the group of threads having executed respective barrier operations, the subgroup including a same number of threads as the determined barrier width, enabling the subgroup of the group of threads to execute respective operations in respective iterations of the loop on the one or more compute units subsequent to the respective barrier operations without waiting for other threads in the group of threads to execute barrier operations, wherein the subgroup of the group of threads is smaller than the total number of threads in the group of threads; and determining not to perform the barrier operation if the barrier width of the barrier operation is smaller than a vector width of a wavefront for the one or more compute units.

17. The computer-readable storage medium of claim 15, wherein the determining comprises:

determining the barrier width of the barrier operation based at least in part on the data parallel code.

18. The computer-readable storage medium of claim 15, further comprising:

determining to perform the barrier operation if the barrier width of the barrier operation is larger than a vector width of a wavefront of the one or more compute units.

19. The computer-readable storage medium of claim 15, wherein the barrier operation is included in a conditional statement, and wherein the conditional statement does not evaluate uniformly throughout the group of threads.

20. The computer-readable storage medium of claim 15, wherein threads in the subgroup of the group of threads are consecutive threads in the group of threads.

* * * * *

UNITED STATES PATENT AND TRADEMARK OFFICE
CERTIFICATE OF CORRECTION

PATENT NO. : 9,218,223 B2  
APPLICATION NO. : 13/965818  
DATED : December 22, 2015  
INVENTOR(S) : Benedict Ruben Gaster Page 1 of 1

It is certified that error appears in the above-identified patent and that said Letters Patent is hereby corrected as shown below:

Claims

Claim 17, column 16, line 9, "The computer-readable storage medium of claim 15," should be changed to -- The computer-readable storage medium of claim 16, --

Claim 18, column 16, line 13, "The computer-readable storage medium of claim 15," should be changed to -- The computer-readable storage medium of claim 16, --

Claim 19, column 16, line 18, "The computer-readable storage medium of claim 15," should be changed to -- The computer-readable storage medium of claim 16, --

Claim 20, column 16, line 22, "The computer-readable storage medium of claim 15," should be changed to -- The computer-readable storage medium of claim 16, --

Signed and Sealed this  
Tenth Day of May, 2016

Michelle K. Lee  
*Director of the United States Patent and Trademark Office*